D. P. TRIBE AND E. F. KOHN.
WIND SHIELD.
APPLICATION FILED FEB. 18, 1919.
1,318,304.   Patented Oct. 7, 1919.
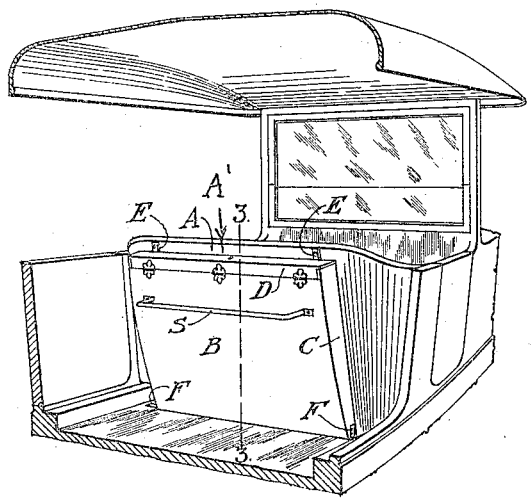
Fig. 1.
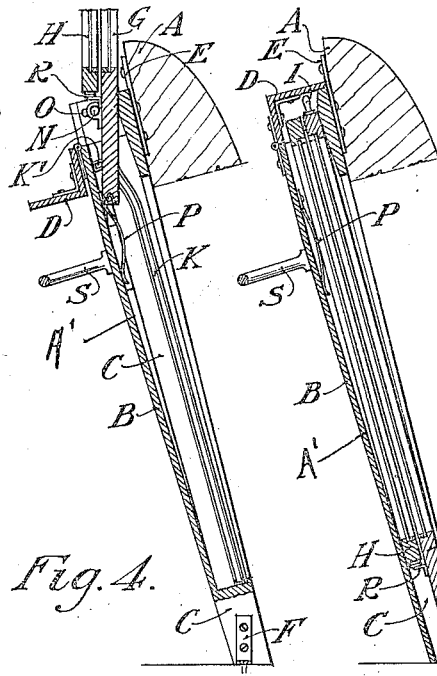
Fig. 4.
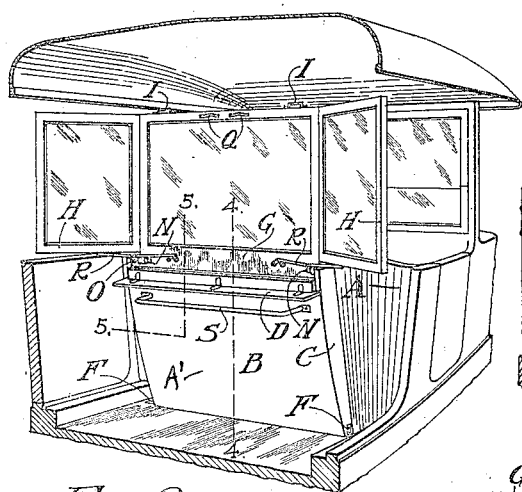
Fig. 2.
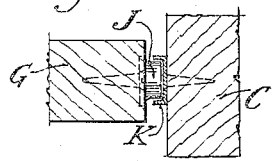
Fig. 7.
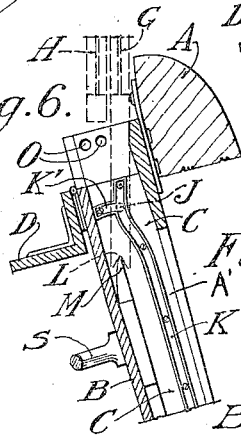
Fig. 6.
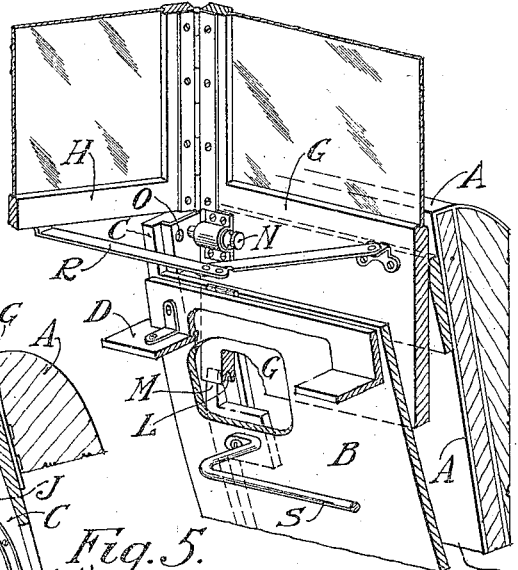
Fig. 5.
Fig. 3.
WITNESSES
Chas. L. Hyde
INVENTORS
DAVID P. TRIBE
ERNEST F. KOHN
BY Marbel + Co.
ATTORNEYS.

UNITED STATES PATENT OFFICE.

DAVID P. TRIBE AND ERNEST F. KOHN, OF LOS ANGELES, CALIFORNIA.

WIND-SHIELD.

1,318,304.　　　　　Specification of Letters Patent.　　　Patented Oct. 7, 1919.

Application filed February 18, 1919. Serial No. 277,728.

*To all whom it may concern:*

Be it known that we, DAVID P. TRIBE and ERNEST F. KOHN, both citizens of the United States, and residents of Los Angeles, in the county of Los Angeles, State of California, have invented certain new and useful Improvements in Wind-Shields, of which the following is a specification.

Our invention relates primarily to a windshield for the rear seat of motor vehicles although we do not limit its use thereto and the object thereof is to provide a windshield of that character which can be easily and quickly adjusted in position for use and which when not required for use can be easily and quickly caused to disappear within a receptacle provided in the rear of the forward seat of the vehicle to which it is attached.

A further object is to provide a windshield for the rear seats of automobiles provided with adjustable wings secured to the outer ends thereof which may be adjusted to suit the conditions of travel.

Other objects and advantages will appear hereinafter and while we have shown and will describe the preferred form of our invention it will be understood that we do not limit ourselves to such preferred form but that various changes and adaptations may be made therein without departing from the spirit of our invention.

In the drawings accompanying and forming a part of this application:

Figure 1 is a perspective view of a fragment of an automobile with our invention in place thereon in its closed position.

Fig. 2 is a view similar to Fig. 1, with our invention in its open position ready for use.

Fig. 3 is a section on the line 3—3 of Fig. 1.

Fig. 4 is a section on the line 4—4 of Fig. 2.

Fig. 5 is a section on the line 5—5 of Fig. 2, enlarged.

Figs. 6 and 7 are enlarged details of portions of our invention.

Referring to the drawings A, represents the rear or back of the front seat of an automobile of any of the well known makes to which is secured a rectangular box or casing composed of the front B, ends C, and a cover D, cover D being L-shaped in transverse section, and being hinged to the back B a little below the top of the ends C.

Straps E and F provide means for securing said casing to the body of the vehicle. Slidably mounted within casing A', to slide vertically is the windshield proper G, to the ends of the upper portion of which are hingedly connected the side wings H, to swing horizontally. Mounted on the ends of the lower portion of member G are guide rollers J which are adapted to be positioned within U-shaped guide tracks K secured to the inner side of the ends B of casing A'. Tracks K are provided near their upper ends with rearwardly extending portions K' for a purpose hereafter explained.

Formed in the lower horizontal ends of member G is a V-shaped groove L in which is adapted to be received the tapered upper edge of a retaining member M secured to the inner face of member B, near the top. A bolt or other suitable fastening means N is mounted upon the outer face of member G and is adapted to be brought into engagement with holes or apertures O in the upper end of one of the ends C of casing A'. A flat spring P is secured to the inner face of member B and is so positioned as to press against the face of wing members H when the device is folded and prevent rattling of the same. Q are strips of felt or other suitable material for providing cushioning means between member G and members H when the device is folded. Any suitable adjusting device R may be provided for adjusting the open position of members H. S is the usual robe rail which is usually secured to the rear of the front seat. In the upper edge of member G are provided handles I for use in withdrawing the said member from casing A'.

In the operation of our invention the parts will first be in the positions shown in Figs. 1 and 3. When it is desired to use the device the cover D will first be opened to hang downwardly as best shown in Figs. 4, 5 and 6. Handles I will then be grasped by the operator and the windshield drawn upwardly until the rollers J are at the topmost extremity of guides K. The shield will then be moved slightly forward and allowed to move downwardly until groove L engages the tapered end of retaining member M which prevents further downward movement. Bolt N is then positioned in the desired hole O, according to the position in which it is desired to hold the shield (straight up, or leaning rearwardly). The wings H are then swung on their hinges to their desired positions and the device is positioned for use. In closing the device these operations are reversed as is obvious.

Having described our invention what we claim is:

1. A disappearing windshield comprising a substantially rectangular casing adapted to be secured to the rear of the seat; a guide channel secured to the ends of said casing to extend vertically thereof; a windshield mounted within said casing to slide vertically thereof; rollers mounted on the sides of said windshield at the lower end thereof adapted to travel in said guide channels; wing members pivotally mounted on the ends of said windshield; means connecting said shield and wing members for adjusting the relative positions thereof; means mounted on said windshield for securing the same in different angular positions relative to said casing; means mounted in said casing for retaining said shield in its elevated position; and a hinged closure for the upper end of said casing.

2. A disappearing wind shield comprising a substantially rectangular casing adapted to be secured to the rear of the seat; guide channels extending vertically of the inner sides of the ends of said casing; a windshield mounted within said casing to slide vertically; means mounted on the sides of said windshield at the lower ends thereof adapted to travel in said guide channels; wing members pivotally mounted on the ends of said main shield; means connecting said main shield and wing members for adjusting the relative positions thereof; means mounted on said main shield for securing the same in different angular positions relative to said casing; means mounted in said casing for retaining said shield in its elevated position; and a hinged closure for the upper end of said casing.

3. A disappearing windshield for vehicles comprising a casing adapted to be secured to the back of the seat; a hinged cover for said casing; a windshield mounted in said casing to slide vertically; guide channels extending vertically of the inner walls of the sides of said casing; means mounted on the sides of said windshield at the lower ends thereof adapted to travel in said channels to confine said shield to a vertical path of movement only; sockets in the inner walls of the sides of said casing at the upper ends thereof connected to said channels and forming an extension thereof adapted to receive the shield confining means and hold said shield in its elevated position.

4. A disappearing windshield comprising a casing adapted to be secured to the rear of the seat; guide channels extending vertically of the inner walls of the sides of said casing and having an offset portion at their upper ends; a windshield mounted within said casing to slide vertically; means mounted on the ends of said windshield at the lower ends thereof adapted to travel in said guide channels and confine said shield to a path of vertical movement only and to be positioned in said offset portions to hold said shield in its elevated position; wing members hingedly secured to the ends of said windshield; means connecting said shield and wing members for adjusting the relative positions thereof; and a hinged closure for the upper end of said casing.

In witness that we claim the foregoing we have hereunto subscribed our names this 6th day of February, 1919.

DAVID P. TRIBE.
ERNEST F. KOHN.